US006488347B1

United States Patent
Bienick

(10) Patent No.: US 6,488,347 B1
(45) Date of Patent: Dec. 3, 2002

(54) REFRIGERATOR SHELF WITH ONE-PIECE INTERNALLY RIBBED/REINFORCED POLYMERIC FRAME AND REINFORCED SUSPENSION HOOKS

(75) Inventor: Craig Bienick, Jenison, MI (US)

(73) Assignee: Gemtron Corporation, Sweetwater, TN (US)

( * ) Notice: Subject to any disclaimer, the term of this patent is extended or adjusted under 35 U.S.C. 154(b) by 17 days.

(21) Appl. No.: 09/716,363

(22) Filed: Nov. 21, 2000

(51) Int. Cl.[7] .............................................. A47B 96/04
(52) U.S. Cl. ...................................... 312/408; 108/108
(58) Field of Search ................................ 312/404, 408, 312/351; 108/108, 107, 106, 901, 147.11, 147.17; 211/90.02, 90.01, 90.04, 134, 193, 119.003, 153, 187; 248/250, 243

(56) References Cited

U.S. PATENT DOCUMENTS

| | | | |
|---|---|---|---|
| 3,633,983 A | 1/1972 | Whitcomb | |
| 4,234,642 A | 11/1980 | Olabisi | |
| 4,407,476 A | * 10/1983 | Bohannan | ............... 248/250 X |
| 4,736,997 A | 4/1988 | Besore et al. | |
| 4,745,775 A | 5/1988 | Bussan et al. | |
| 4,870,836 A | 10/1989 | Pink | |
| 4,936,641 A | 6/1990 | Bussan et al. | |
| 4,960,308 A | * 10/1990 | Donaghy | ................ 211/134 X |
| 5,188,246 A | 2/1993 | Maxworthy | |
| 5,340,209 A | 8/1994 | Kolbe et al. | |
| 5,403,084 A | 4/1995 | Kane et al. | |
| 5,441,338 A | 8/1995 | Kane et al. | |
| 5,454,638 A | 10/1995 | Bird et al. | |
| 5,516,204 A | 5/1996 | Calvert et al. | |
| 5,524,981 A | 6/1996 | Herrmann et al. | |
| 5,540,493 A | 7/1996 | Kane et al. | |
| 5,564,809 A | 10/1996 | Kane et al. | |
| 5,660,777 A | 8/1997 | Herrmann et al. | |
| 5,705,113 A | 1/1998 | Kane et al. | |
| 5,735,589 A | 4/1998 | Herrmann et al. | |
| 5,738,880 A | 4/1998 | Kane et al. | |
| 5,947,574 A | * 9/1999 | Avendano | ................... 312/408 |

FOREIGN PATENT DOCUMENTS

| | | |
|---|---|---|
| EP | 0886116 | 12/1998 |
| FR | 2660740 | 10/1991 |
| FR | 2663411 | 12/1991 |
| WO | WO 99 37961 A | 7/1999 |

* cited by examiner

Primary Examiner—Janet M. Wilkens
(74) Attorney, Agent, or Firm—Diller, Ramik & Wight

(57) ABSTRACT

A refrigerator shelf is defined by a glass shelf panel bounded by an integral, injection molded, substantially homogeneous, one-piece frame of polymeric/copolymeric plastic material. The frame includes two thin spaced depending peripheral walls spanned by a plurality of spaced reinforcing webs effecting rigidifying of the frame to afford the shelf appreciable weight bearing and anti-torquing characteristics. A pair of identical relatively broad hooks each including a plurality of vertically extending parallel reinforcing ribs are utilized for interlocking the shelf to relatively broad horizontally aligned openings in a refrigerator inner liner.

36 Claims, 2 Drawing Sheets

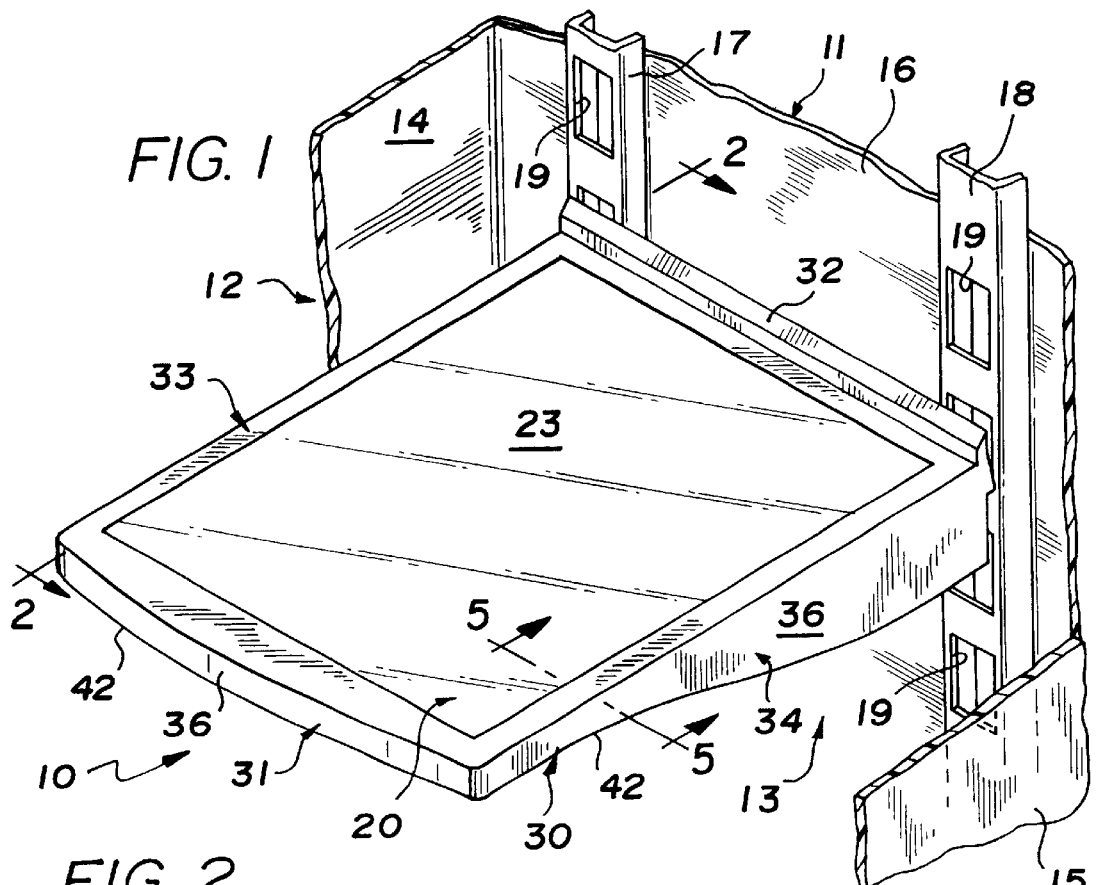
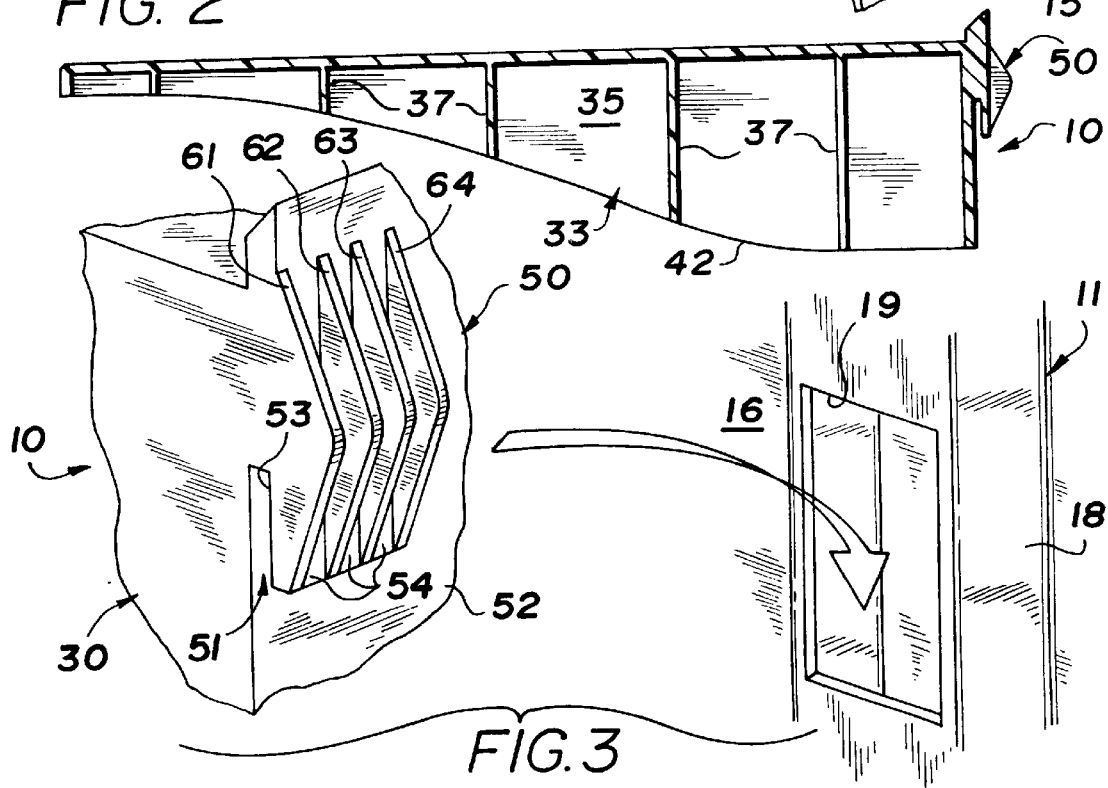

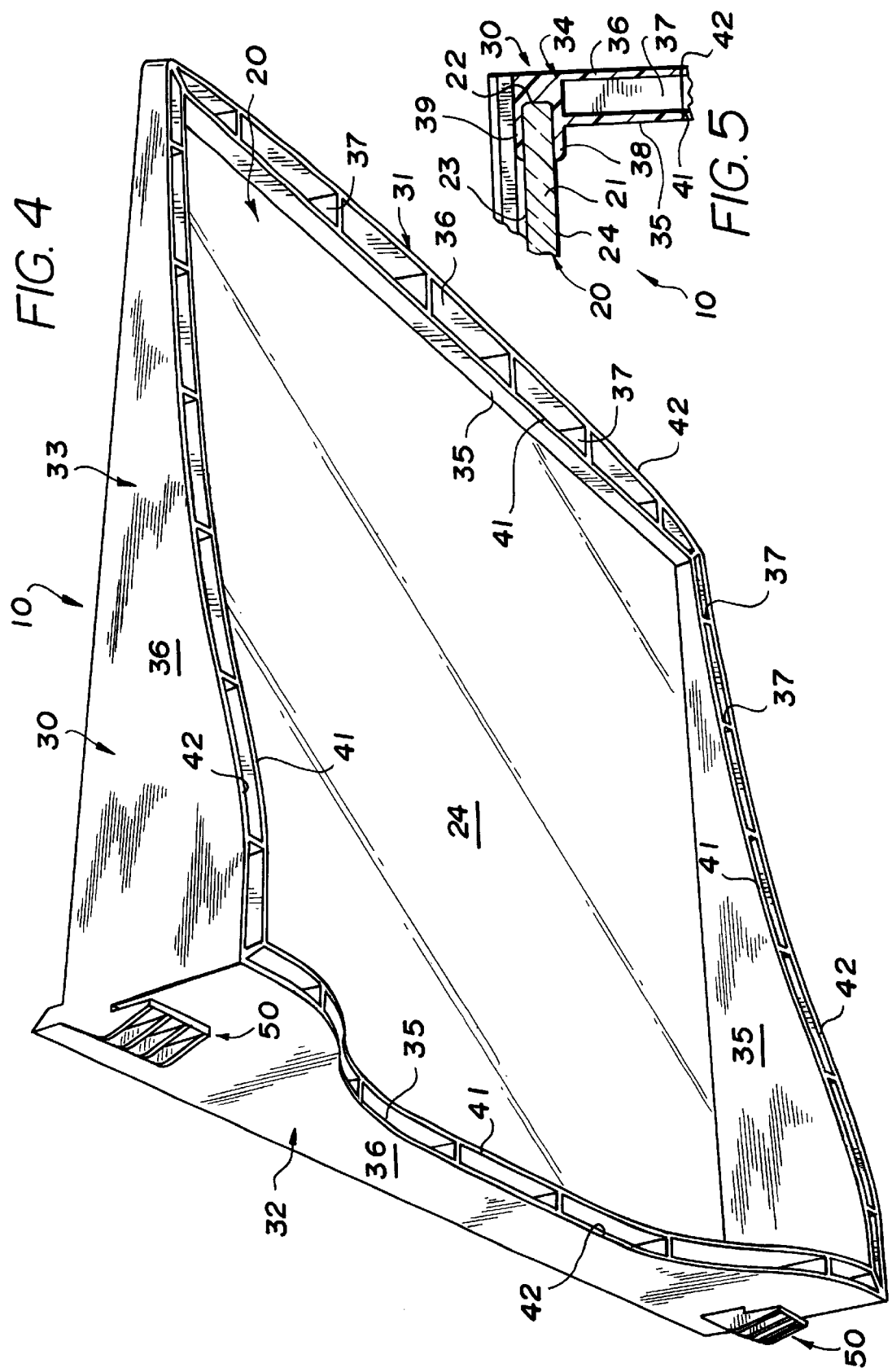

REFRIGERATOR SHELF WITH ONE-PIECE INTERNALLY RIBBED/REINFORCED POLYMERIC FRAME AND REINFORCED SUSPENSION HOOKS

BACKGROUND OF THE INVENTION

This invention is directed to a shelf for refrigerators, though it is equally applicable for utilization as a book shelf or a shelf associated with most any type of furniture utilizing a cantilevered shelf.

Shelves specifically designed for refrigerators are well known, and typical thereof are the various shelves disclosed in U.S. Pat. No. 5,524,981 granted on Jun. 11, 1996 to Robert S. Herrmann et al. Each of the shelves of this patent include a cantilevered shelf which is defined by a glass panel and a peripheral frame defined by front and rear frame portions and opposite generally parallel side portions each having spaced ribs which define a groove for receiving a flange of a sliding "crisper" drawer. The side walls each include a projecting hook which are engaged in horizontally aligned openings of a refrigerator compartment. Horizontal ribs afford the frame a modicum of rigidity along the length of the side walls, but no provision is made for front or rear rigidity which can create torque forces sufficient to bend or break the relatively narrow and weak hooks, particularly when the shelf panel and/or the drawer are heavily loaded with products. This difficulty is exacerbated if a relatively heavy/full drawer is pulled forward to gain access to products therein which lengthens the moment arm of the shelf and exacerbates the load applied to the hooks causing damage/destruction thereof. The latter is particularly true when the entire frame is formed of a single piece of molded polymeric/copolymeric synthetic plastic material, such as that disclosed relative to FIGS. 1 and 2 of the latter patent Reinforcement can be achieved by forming separate rail members and riveting these to the side members of the upper shelf, as shown in FIG. 3 of the latter patent, but though this affords reinforcement, it also increases the overall weight of the shelf and the cost of manufacture/fabrication/assembly thereof.

Additional reinforcement by utilizing metallic side hanger brackets, as is illustrated in FIG. 5a of this patent, creates a relatively sturdy and rigid shelf, though a plurality of separate components must be separately united, some by rivets and some by an integrally injection molded frame which results in slow productivity and high material and end product costs.

It is also conventional to utilize metal side shelf brackets which are united by pairs of parallel rods for rigidity and with the metal side shelf brackets having hooks for hooking into horizontally aligned openings. A slider or sliding shelf formed of a glass panel and an injection molded frame has opposite side walls which are contoured to slide upon rails of the side shelf brackets, much as the manner illustrated in FIG. 10 of the latter patent. If the shelf is not required to function as a slider, the peripheral injection molded frame can be utilized to integrally unite (through molding) the metal side brackets and associated hooks to a glass panel, much in the manner illustrated in FIGS. 1, 3 and 5 of the latter patent.

U.S. Pat. No. 5,454,638 granted on Oct. 3, 1995 to Kevin C. Bird et al. is another example of a shelf having metallic side hanger brackets which are united to a glass panel by an injection molded frame. In this case rigidity is afforded the shelf by double hooks at each of the side brackets which are connected to a horizontal shelf rail bridging vertical posts carrying vertically spaced openings. The overall structure is relatively rigid, but the cost of materials and production is quite high and approaches commercial unfeasibility.

Other patents which disclose variations similar to those just described are disclosed in U.S. Pat. No. 5,403,084 granted on Apr. 4, 1995 to Edmund J. Kane et al., U.S. Pat. No. 5,540,493 granted on Jul. 30, 1996 to Edmund J. Kane et al., U.S. Pat. No. 5,660,777 granted on Aug. 26, 1997 to Robert S. Herrmann et al., U.S. Pat. No. 5,564,809 granted on Oct. 15, 1996 to Edmund J. Kane et al., U.S. Pat. No. 5,705,113 granted on Jan. 6, 1998 to Edmund J. Kane et al., U.S. Pat. No. 5,441,338 granted on Aug. 15, 1995 to Edmund J. Kane et al., U.S. Pat. No. 5,735,589 granted on Apr. 7, 1998 to Robert S. Herrmann et al., and U.S. Pat. No. 5,738,880 granted on Apr. 14, 1998 to Edmund J. Kane et al.

All of the patents thus far described are owned by the assignee of the present invention, namely, Gemtron Corporation of Sweetwater, Tenn., USA, a manufacturer of shelving for many well known refrigerator manufacturers who themselves have patents directed to refrigerator shelves, such as U.S. Pat. No. 5,516,204 granted on May 14, 1996 to Scott A. Calvert et al. and assigned to General Electric Company; U.S. Pat. No. 4,936,641 granted on Jun. 26, 1990 to Marc R. Bussan and assigned to Whirlpool Corporation; U.S. Pat. No. 4,870,836 granted on Oct. 3, 1989 to John J. Pink and assigned to Amana Refrigeration, Inc. and others, such as U.S. Pat. Nos. 4,745,775; 5,188,246; 3,633,983; 5,340,209 and 4,736,997 granted respectively on May 24, 1988; Feb. 23, 1993; Jan. 11, 1972; Aug. 23, 1994; and Apr. 12, 1988.

These patents establish the substance of the state of the art in this field and over which the present disclosure is considered a novel and unobvious departure.

SUMMARY OF THE INVENTION

In keeping with the foregoing, a novel refrigerator shelf of the present invention is constructed so as to be readily manufactured from a minimum number of components, and in reality only a single component is utilized during manufacture, yet the refrigerator shelf is attractive, stable, rigid, resistant to torque deflection, and can be manufactured rapidly and relatively inexpensively while at the same time being comparatively lightweight when measured against conventional refrigerator shelves. Low cost, attractiveness, strength and adaptability are functional characteristics of the present refrigerator shelf which uniquely distinguish the same from any one or all of the prior art shelves heretofore disclosed.

The refrigerator shelf of the present invention is manufactured from a single piece or panel of glass and injection molding a continuous border thereabout with suspension hooks projecting rearwardly and serving as integral cantilever suspension hooks for the shelf. To this extent, the shelf corresponds to the upper shelf of the first-mentioned patent, but distinguishes thereover in two important and specific features, namely, (1) at a minimum a pair of spaced side frame portions of the frame are each defined by inner and outer substantially spaced walls projecting below a lower surface of the glass shelf panel and between which span a plurality of reinforcing ribs, and (2) the suspension or cantilever hooks are relatively broad and each is provided with at least two vertically disposed substantially parallel spaced reinforcing ribs. The latter two structural features create a refrigerator shelf of extremely low cost, high aesthetics and increased strength including high resistance to torque and heavy product loading.

In further accordance with this invention, front and rear frame portions are likewise constructed from inner and outer substantially parallel spaced walls with reinforcing ribs spanning therebetween which particularly aid in resisting cocking or torquing of the refrigerator shelf.

In addition to the foregoing structural features of the invention, another important feature is that of locating the inner walls of at least the side frame portions beneath and inboard of a peripheral edge of the glass shelf panel which assures underlying peripheral support of the entire glass shelf panel affording maximum strength to the shelf, as well as resistance to cantilevered overloading, torquing or cocking thereof.

With the above and other objects in view that will hereinafter appear, the nature of the invention will be more clearly understood by reference to the following detailed description, the appended claims and the several views illustrated in the accompanying drawings.

FIG. 1 is a perspective view of a novel refrigerator shelf of the present invention, and illustrates the refrigerator shelf formed from a piece of tempered glass or a glass panel bordered by an integral, injection molded, substantially homogeneous one-piece frame of polymeric/copolymeric plastic material.

FIG. 2 is an enlarged cross-sectional view taken generally along line 2—2 of FIG. 1, and illustrates one of two opposite side frame portions of the frame which is defined by spaced parallel side walls, of which only one side wall is shown, and a plurality of reinforcing ribs interconnected therebetween.

FIG. 3 is a fragmentary enlarged perspective view, and illustrates one of a pair of reinforced hooks of the shelf prior to introduction into a relatively wide slot or opening formed in an integral rib of a refrigerator inner liner.

FIG. 4 is a bottom perspective view of the refrigerator shelf of the invention and illustrates front, rear and parallel side fame portions, each defined by spaced parallel inner and outer walls and reinforcing ribs therebetween, as well as reinforced suspension hooks carried by the rear portion.

FIG. 5 is a cross-sectional view taken generally along line 5—5 of FIG. 1, and illustrates a totally encapsulated peripheral edge of the tempered glass panel with an inner wall of one of the side frame portions underlyingly supporting the glass panel peripheral edge.

DESCRIPTION OF THE PREFERRED EMBODIMENT

A refrigerator shelf constructed in accordance with this invention is generally designated by the reference numeral 10, and in FIG. 1 the refrigerator shelf 10 is shown in interlocked cantilevered relationship to an inner liner 11 of a refrigerator 12 which includes a cooling chamber or interior 13 defined in part by side walls 14, 15 in substantially parallel relationship to each other and normal to a rear wall 16 including integral generally parallel forwarding-projecting vertical ribs 17, 18, each having relatively wide and elongated openings 19. The entire inner liner 11, including the integral components 14 through 18, is constructed as an integral, molded, substantially homogeneous, single piece of material which is inserted into a refrigerator or refrigerator frame (not shown) in a conventional manner. The openings or apertures 19 serve as fastening or coupling points for the refrigerator shelf 10, as will be described hereinafter.

The refrigerator shelf 10 includes a glass shelf panel 20 formed from a piece of tempered glass which is of a generally polygonal configuration and is defined by a peripheral edge portion 21 (FIG. 5) terminating in a peripheral terminal edge 22 which blends with respective upper and lower surfaces 23, 24, respectively, of the glass shelf panel 20.

The refrigerator shelf 10 also includes an integral, injection molded, substantially homogeneous one-piece frame 30 substantially entirely bordering the peripheral edge portion 21 of the glass shelf panel 20.

The frame includes a front frame portion 31, a rear frame portion 32, an opposite substantially parallel side frame portions 33, 34.

The front, rear and side frame portions 31–34 are each defined by an inner wall 35 in substantially spaced parallel relationship to an outer wall 36 and bridging therebetween are a plurality of substantially parallel reinforcing ribs or webs 37 (FIGS. 2, 4 and 5). Each inner wall 35 projects downwardly from an inwardly directed lip or flange 38 (FIG. 5) of the border 30, and each inner wall 35 is inboard of the peripheral terminal edge 22 of the glass panel 20 (FIG. 5) to thereby underlyingly support the same and articles (not shown) positioned upon the upper surface 23 of the glass shelf panel 20. Each outer wall 36 is outboard of the peripheral terminal edge 22 of the glass shelf panel 20, as is best illustrated in FIG. 5, but both walls 35, 36 can be located inboard of the peripheral terminal edge 22 of the glass shelf panel 20 if found necessary or desirable in order to afford further underlying support to the glass shelf panel 20. An upper lip or flange 39 (FIG. 5) of the border 30 defines a water-tight seal with the upper surface 23 of the glass shelf panel 20 thereby defining therewith a conventional "dam" which prevents product leakage peripherally beyond the border 30.

The walls 35, 36 and the ribs 37 are relatively thin and each extends from the lower flange or lip 38 to a respective lower terminal edge 41, 42 of the respective walls 35, 36. The latter construction affords the border 30 appreciable weight bearing characteristics, as well as anti-torquing characteristics, and provides the same at a relatively low overall weight as compared to the weight of a like sized and contoured border which is injection molded from solid polymeric/copolymeric plastic material. In other words, appreciable weight reduction is achieved by the relatively thin walls 35, 36 and ribs 37 and the relative spacing therebetween which is accomplished at an appreciable reduction in material costs absent sacrificing strength and rigidity.

The rear frame portion 32 includes identical means 50 (FIGS. 3 and 4) in the form of a pair of hook means projecting rearwardly from and in at least partial spaced relationship to the rear frame portion 32. The partially spaced relationship of each hook 50 relative to the rear frame portion 32 is defined by an associated slot 51 which is in turn defined by a rear surface 52 of the rear frame portion 32 and an inner surface 53 of a relatively broad wall 54 of each hook 50. Reinforcing means 60 in the form of four vertically disposed hook-shaped reinforcing ribs 61 through 64 project from the wall 54 and are in spaced parallel relationship to each other. The hook-shaped reinforcing ribs 61 through 64 reinforce the wall 54 of each of the hooks 50 and dramatically lessen the weight thereof while at the same time providing increased width, as compared to conventional narrow shelf hooks of this type. Thus, when each hook 50 is inserted in the corresponding opening 19 and is slid downwardly into the interconnected relationship illustrated in FIG. 1, the weight of the shelf 10 and any products thereon transfer to the wall 54 is efficiently supported due to the relatively great width of the wall 54, as measured between the exterior surfaces (unnumbered) of the hook-shaped reinforcing ribs 61 and 64, and the reinforcement afforded the wall 54 by the hook-shaped reinforcing ribs 61 through 64.

The refrigerator shelf 10, as thus described, is of an extremely rigid and lightweight construction, yet is relatively inexpensive to manufacture because of the lesser amount of polymeric/copolymeric material required for a refrigerator shelf of the same size having a solid border, as is common in the prior art. Furthermore, the refrigerator shelf 10 is aesthetically appealing, particularly as compared to shelves whose borders are formed of multiple individual pieces, even such as are commonly manufactured utilizing metal shelf brackets encapsulated inside frame portions by an integral injection molded frame, such as disclosed in commonly assigned U.S. Pat. No. 5,524,981. Production costs are also less than those involved in manufacturing shelves of the type disclosed in the latter-identified patent and others similar thereto.

Although a preferred embodiment of the invention has been specifically illustrated and described herein, it is to be understood that minor variations may be made in the apparatus without departing from the spirit and scope of the invention, as defined the appended claims.

What is claimed is:

1. A refrigerator shelf for use in a refrigerator compartment comprising a shelf panel, said shelf panel including upper and lower surfaces merging with a peripheral edge to define therewith a peripheral edge portion of a predetermined peripheral configuration; an integral, molded, substantially homogeneous one-piece frame substantially entirely bordering said peripheral edge portion; said frame including a front frame portion, a rear frame portion and a pair of spaced side frame portions each spanning between said front and rear frame portions; said side frame portions each being defined by inner and outer substantially spaced walls projecting below said shelf panel lower surface, and a plurality of reinforcing webs spanning said inner and outer walls in spaced relationship to each other to rigidify said side frame portions thereby affording said refrigerator shelf appreciable weight bearing characteristics.

2. The refrigerator shelf as defined in claim 1 wherein said front frame portion is defined by inner and outer substantially spaced walls projecting below said shelf panel lower surface, and a plurality of reinforcing webs spanning said front frame portion inner and outer walls in spaced relationship to each other to rigidify said front frame portion thereby affording said refrigerator shelf appreciable weight bearing characteristics.

3. The refrigerator shelf as defined in claim 2 wherein each inner spaced wall underlies a peripheral side edge portion of said shelf panel inboard of said shelf panel peripheral edge.

4. The refrigerator shelf as defined in claim 3 including a pair of substantially wide hooks in spaced relationship to each other projecting rearwardly from and in at least partial spaced relationship to said frame portion, and said hooks each being defined by a portion of said integral, molded, substantially homogeneous, one-piece frame.

5. The refrigerator shelf as defined in claim 2 wherein each inner spaced wall underlies a peripheral side edge portion of said shelf panel inboard of said shelf panel peripheral edge, and each outer spaced wall lies outboard of said shelf panel peripheral edge.

6. The refrigerator shelf as defined in claim 5, including a pair of substantially wide hooks in spaced relationship to each other projecting rearwardly from and in at least partial spaced relationship to said frame portion, and said hooks each being defined by a portion of said integral, molded, substantially homogeneous, one-piece frame.

7. The refrigerator shelf as defined in claim 1 wherein said rear frame portion is defined by inner and outer substantially spaced walls projecting below said shelf panel lower surface, and a plurality of reinforcing webs spanning said rear frame portion inner and outer walls in spaced relationship to each other to rigidify said rear frame portion thereby affording said refrigerator shelf appreciable weight bearing characteristics.

8. The refrigerator shelf as defined in claim, 7 wherein each inner spaced wall underlies a peripheral side edge portion of said shelf panel inboard of said shelf panel peripheral edge.

9. The refrigerator shelf as defined in claim 8 including a pair of substantially wide hooks in spaced relationship to each other projecting rearwardly from and in at least partial spaced relationship to said frame portion, and said hooks each being defined by a portion of said integral, molded, substantially homogeneous, one-piece frame.

10. The refrigerator shelf as defined in claim 7 wherein each inner spaced wall underlies a peripheral side edge portion of said shelf panel inboard of said shelf panel peripheral edge, and each outer spaced wall lies outboard of said shelf panel peripheral edge.

11. The refrigerator shelf as defined in claim 10 including a pair of substantially wide hooks in spaced relationship to each other projecting rearwardly from and in at least partial spaced relationship to said frame portion, and said hooks each being defined by a portion of said integral, molded, substantially homogeneous, one-piece frame.

12. The refrigerator shelf as defined in claim 1 wherein said front and rear frame portions are each defined by inner and outer substantially spaced walls projecting below said shelf panel lower surface, and a plurality of reinforcing webs spanning said front and rear frame portions inner and outer walls in spaced relationship to each other to rigidify said front and rear frame portions thereby affording said refrigerator shelf appreciable weight bearing characteristics.

13. The refrigerator shelf as defined in claim 12 wherein each inner spaced wall underlies a peripheral side edge portion of said shelf panel inboard of said shelf panel peripheral edge.

14. The refrigerator shelf as defined in claim 13 including a pair of substantially wide hooks in spaced relationship to each other projecting rearwardly from and in at least partial spaced relationship to said frame portion, and said hooks each being defined by a portion of said integral, molded, substantially homogeneous, one-piece frame.

15. The refrigrator shelf as defined in claim 12 wherein each inner spaced wall underlies a peripheral side edge potion of said shelf panel inboard of said shelf panel peripheral edge, and each outer spaced wall lies outboard of said shelf panel peripheral edge.

16. The refrigerator shelf as defined in claim 15 including a pair of substantially wide hooks in spaced relationship to each other projecting rearwardly from and in at least partial spaced relationship to said frame portion, and said hooks each being defined by a portion of said integral, molded, substantially homogeneous, one-piece frame.

17. The refrigerator shelf as defined in claim 1 wherein said inner and outer walls are in substantially parallel relationship to each other.

18. The refrigerator shelf as defined in claim 1 wherein said inner and outer walls are in substantially parallel relationship to each other, and said reinforcing webs are in substantially parallel relationship to each other.

19. The refrigerator shelf as defined in claim 1 wherein said inner and outer walls are in substantially parallel relationship to each other, and said reinforcing ribs are substantially normal to said inner and outer walls.

20. The refrigerator shelf as defined in claim 1 including hook means projecting rearwardly from and in at least partial spaced relationship to said rear frame portion, and said hook means are defined by a portion of said integral, molded, substantially homogeneous, one-piece frame.

21. The refrigerator shelf as defined in claim 1 including hook means projecting rearwardly from and in at least partial spaced relationship to said rear frame portion, said hook means are defined by a portion of said integral, molded, substantially homogeneous, one-piece frame, and means for reinforcing said hook means.

22. The refrigerator shelf as defined in claim 1 including hook means projecting rearwardly from and in at least partial spaced relationship to said rear frame portion, said hook means are defined by a portion of said integral, molded, substantially homogenous, one-piece frame, means for reinforcing said hook means, and said reinforcing means include at least a pair of spaced reinforcing ribs.

23. The refrigerator shelf as defined in claim 1 including hook means projecting rearwardly from and in at least partial spaced relationship to said rear frame portion, said hook means are defined by a portion of said integral, molded, substantially homogeneous, one-piece frame, means for reinforcing said hook means, and said reinforcing means include at least a pair of spaced parallel reinforcing ribs.

24. The refrigerator shelf as defined in claim 1 including a pair of substantially wide hooks in spaced relationship to each other projecting rearwardly from and in at least partial spaced relationship to said rear frame portion, and said hooks each being defined by a portion of said integral, molded, substantially homogeneous, one-piece frame.

25. The refrigerator shelf as defined in claim 1 including a pair of substantially wide hooks in spaced relationship to each other projecting rearwardly from and in at least partial spaced relationship to said rear frame portion; said hooks each being defined by a portion of said integral, molded, substantially homogeneous, one-piece frame; means for reinforcing each hook, and said reinforcing means each including at least a pair of spaced reinforcing ribs.

26. The refrigerator shelf as defined in claim 1 wherein each inner spaced wall underlies a peripheral side edge portion of said shelf panel inboard of said shelf panel peripheral edge.

27. The refrigerator shelf as defined in claim 1 wherein each inner spaced wall underlies a peripheral side edge portion of said shelf panel inboard of said shelf panel peripheral edge, and each outer spaced wall lies outboard of said shelf panel peripheral edge.

28. A refrigerator compartment comprising at least a back wall and opposite side walls defining a chamber; at least two substantially parallel vertical rows of vertically spaced, horizontally aligned openings in said chamber; a refrigerator shelf housed in said chamber, said refrigerator shelf including a shelf panel, said shelf panel including upper and lower surfaces merging with a peripheral edge to define therewith a peripheral edge portion of a predetermined peripheral configuration; an integral, molded, substantially homogeneous one-piece frame substantially entirely bordering said peripheral edge portion; said frame including a front frame portion, a rear frame portion and a pair of spaced side frame portions each spanning between said front and rear frame portions; said side frame portions each being defined by inner and outer substantially spaced walls projecting below said shelf panel lower surface, a plurality of reinforcing webs spanning said inner and outer walls in spaced relationship to each other to rigidify said side frame portions thereby affording said refrigerator shelf appreciable weight bearing characteristic, said rear frame portion being defined by inner and outer substantially spaced walls projecting below said shelf panel lower surface, a plurality of reinforcing webs spanning said rear frame portion inner and outer walls in spaced relationship to each other to rigidify said rear frame portion thereby affording said refrigerator shelf appreciable weight bearing characteristics; a pair of hook means projecting rearwardly from and in at least partial spaced relationship to said rear frame portion; each of said hook means being defined by a portion of said integral, molded substantially homogeneous, one-piece frame; and said pair of hook means being hooked into a pair of said horizontally aligned openings.

29. The refrigerator compartment as defined in claim 28 including means for reinforcing each of said hook means.

30. The refrigerator compartment as defined in claim 28 including means for reinforcing each of said hook means, and said reinforcing means each including at least one pair of spaced substantially vertically extending reinforcing ribs.

31. The refrigerator compartment as defined in claim 28 including means for reinforcing each of said hook means, and said reinforcing means each including at least one pair of spaced substantially vertically extending parallel reinforcing ribs.

32. A refrigerator compartment comprising at least a back wall and opposite side walls defining a chamber; at least two substantially parallel vertical rows of vertically spaced, horizontally aligned openings in said chamber; a refrigerator shelf housed in said chamber, said refrigerator shelf including a shelf panel, said shelf panel including upper and lower surfaces merging with a peripheral edge to define therewith a peripheral edge portion of a predetermined peripheral configuration; an integral, molded, substantially homogeneous one-piece frame substantially entirely bordering said peripheral edge portion; said frame including a front frame portion, a rear frame portion and a pair of spaced side frame portions each spanning between said front and rear frame portion; a pair of hook means projecting rearwardly from and in at least partial spaced relationship to said rear frame portion; each of said hook means being defined by a portion of said integral, molded substantially homogeneous, one-piece frame; said pair of hook means being hooked into a pair of said horizontally aligned openings, and means for reinforcing each of said hook means.

33. The refrigerator compartment as defined in claim 32 wherein said reinforcing means each include at least one pair of spaced substantially vertically extending reinforcing ribs.

34. The refrigerator compartment as defined in claim 32 wherein said reinforcing means each include at least one pair of spaced substantially vertically extending parallel reinforcing ribs.

35. The refrigerator compartment as defined in claim 34 wherein each hook means includes a relatively broad wall spaced from said rear frame portion, and said reinforcing ribs are disposed in substantially transverse relationship to said broad wall.

36. The refrigerator compartment as defined in claim 33 wherein each hook means includes a relatively broad wall spaced from said rear frame portion, and said reinforcing ribs are disposed in substantially transverse relationship to said broad wall.

* * * * *